United States Patent
Gurley et al.

(10) Patent No.: US 7,374,182 B2
(45) Date of Patent: May 20, 2008

(54) SYSTEM AND METHOD FOR SHOPPING CART LINER

(75) Inventors: Connie Gurley, Surprise, AZ (US); Edward Buvalla, Surprise, AZ (US); Rhonda Holbrook, Surprise, AZ (US)

(73) Assignee: Rsanecr, Inc., Surprise, AZ (US)

( * ) Notice: Subject to any disclaimer, the term of this patent is extended or adjusted under 35 U.S.C. 154(b) by 242 days.

(21) Appl. No.: 10/710,353

(22) Filed: Jul. 2, 2004

(65) Prior Publication Data
US 2006/0001225 A1    Jan. 5, 2006

(51) Int. Cl.
B62B 3/14 (2006.01)
(52) U.S. Cl. ................... 280/33.993; 280/33.992
(58) Field of Classification Search .......... 280/33.992, 280/33.993; 297/256.17; 224/409, 411
See application file for complete search history.

(56) References Cited

U.S. PATENT DOCUMENTS

| | | | | |
|---|---|---|---|---|
| 3,028,066 A | * | 4/1962 | Bumby | .................. 220/23.9 |
| 4,560,096 A | * | 12/1985 | Lucas et al. | ................. 224/411 |
| 4,805,937 A | * | 2/1989 | Boucher et al. | ....... 280/33.992 |
| 4,991,978 A | * | 2/1991 | Ostrowski | ...................... 383/4 |
| 5,649,718 A | * | 7/1997 | Groglio | ....................... 280/641 |
| 5,829,835 A | * | 11/1998 | Rogers et al. | .......... 297/256.17 |
| 5,918,798 A | * | 7/1999 | Frahm | .................... 229/117.07 |
| 6,237,998 B1 | * | 5/2001 | Aprile | .................... 297/219.12 |
| 6,517,155 B1 | * | 2/2003 | Landine | ................. 297/256.17 |
| 6,966,565 B1 | * | 11/2005 | Ryan et al. | ............ 280/33.992 |

* cited by examiner

Primary Examiner—Frank B Vanaman
(74) Attorney, Agent, or Firm—Snell & Wilmer, L.L.P.

(57) ABSTRACT

A system and method for providing a baffler between contents transported in a shopping cart and potential pathogens and contaminates on the shopping cart upper surface. The invention is a cart liner which is placed between the contents and the shopping cart's upper surface to prevent the contents from contacting the surface. The shopping cart liner may be converted to a baglike structure for transporting the contents following transport.

9 Claims, 8 Drawing Sheets

SYSTEM AND METHOD FOR SHOPPING CART LINER

FIELD OF INVENTION

The present invention generally relates to a protective liner for shopping carts. More particularly, the invention relates to a system and method for shielding grocery store purchases and persons transported in a shopping cart from contaminants and pathogens resting on a shopping cart surfaces.

BACKGROUND OF INVENTION

In a typical shopping experience, the average shopper uses hand propelled shopping carts or shopping carts to transport items the shopper wishes to purchase. Ordinarily a shopper places household items, produce, or meat products into the shopping cart, conveys the items to a checkout counter, then removes the items from the cart for purchase. The shopper may then leave the shopping cart at the store location for use by subsequent shoppers, who may also use the cart to transport items as described above.

A typical shopping cart may be used multiple times in a single day by a plurality of shoppers. In some instances, the items placed in the shopping cart may leave an infectious residue, such as blood, mucus, urine, saliva, chemicals, pesticides or the like, on the cart's surface or in the cart's basket. The residue is often left on the cart during each use, thereby causing the residue to build up over time.

Occasionally, a shopper may have a communicable illness, which may be easily transferred to the cart and possibly to any subsequent shoppers. It is well known that disease agents are passed or vectored from infected individuals to other individuals directly, through body contact, or indirectly, through contact with objects that have come into body contact with infected individuals. While disease agents such as the cold virus typically do not remain infectious outside of the human body for more than a few hours because of drying or desiccation, many similar viruses will remain active outside of the body for up to six hours in moist conditions and up to four hours in dry conditions. There are also many bacterial disease organisms that may be transferred directly or indirectly and that may be infectiously viable for considerably longer periods of time. For example, some strains of staphylococcus and streptococci bacteria are quite resistant to drying and thus remain infectious for long periods of time. Indeed, staphylococcus aureus has achieved considerable notoriety as a so-called nosocomial, or hospital, infectant—one that is frequently spread in hospitals as well as in other environments via objects that come into contact with susceptible individuals.

In some instances many shoppers pay less attention to their personal hygiene than might be desirable. Even fastidiously clean individuals may unwittingly transfer disease organisms to others via the handles of hand-propelled carts. Some members of the public recognize this danger and are loathe to touch the handles of hand-propelled carts. Indeed, parents have begun to recognize that it may be detrimental for their children to chew or teethe on cart handles (not an uncommon occurrence).

The pathogens associated with illnesses may be transferred from the shopper to the shopping cart during normal cart usage. As such, when a subsequent shopper uses the cart, the subsequent shopper may contract the illness as well.

In the instance where the shopping cart is used to transport the items into the parking lot area, the cart may additionally be soiled by dirt and debris (e.g., gum, oil, transmission fluid, gasoline, etc.) cast onto the cart from, for example, the parking lot surface.

The pathogens, debris and residue discussed above may be called "contaminants" herein. Typically, a shopping cart may be in use for many years without the contaminants being removed. A study done by the University of Arizona Microbiology Department tested areas of shopping carts, which are most often contacted by the shopper or articles transported in the shopping cart. The test conducted involved analyzing swab samples retrieved from the shopping carts to determine the presence of any foreign organic matter. The results of the study suggested that a full fifty-four percent of the shopping carts contained harmful contaminants. As such, a need exists for a system and method for protecting the average shopper from the health danger associated with using shopping carts during their shopping experience.

One such system which is used is the Clean Shopper® baby/toddler shopping cart seat cover sold by Babe Ease, LLC of Pelham, N. H. The Clean Shopper® cover is a re-usable cotton, quilted shopping cart cover that fits over the entire front portion of the shopping cart (e.g. child transport areas), which is ordinarily used to seat and transport an infant or small child. The child is seated on the Clean Shopper® cover during cart usage. In this way, a toddler may be seated in the shopping cart without being exposed to the cart's contaminated surface.

One drawback to the Clean Shopper° cover is that the cotton or quilted material from which it is constructed is porous. As such, the Clean Shopper® cover is prone to having the contaminants transferred to the Clean Shopper® cover from the shopping cart's surface during each use, thereby contaminating the Clean Shopper® cover. Another drawback is that the Clean Shopper cover does not cover the entire shopping cart. Thus, the contaminants which are present in the cart's basket, for example, may be transferred to the items transported on the basket's surface.

Consequently, a need exists for a system and method which protects the shopper and the articles or persons transported by the shopping cart from contaminates which may exist on portion of a shopping cart's surface.

SUMMARY OF INVENTION

The present invention relates to a system and method for protecting articles and persons transported in shopping carts from disease agents infectious germs, fluids, bacteria, pathogens, or other similar organisms, which are likely to be deposited on a shopping cart surface.

In one aspect, the invention is a material liner, which substantially covers the interior of the shopping cart basket. A first surface of the liner, called the "liner bottom surface," herein, is positioned overlying an upper surface of the shopping cart basket. Articles that are transported in the basket are placed on a second surface of the liner that is opposite the liner first surface placed. The liner thereby shields the articles from contaminates existing on the cart's surface. The second surface of the liner, called the "liner upper surface," supports the articles the articles, during transport and provides a barrier between the articles and the shopping cart basket.

In another aspect of the invention, the shopping cart liner substantially covers a shopping cart child transport area adjacent to the shopping cart basket. The liner bottom surface may be formed of sufficient length and shape to be positioned overlying the shopping cart child transport area for providing a barrier layer between the shopping cart child transport area and any passenger or articles transported therein.

In yet another aspect of the invention, the shopping cart liner substantially covers a shopping cart handle positioned adjacent the shopping cart basket. The liner bottom surface may be of sufficient length and shape to wrap around the handle to provide a barrier between the handle and the hands of a shopping cart user.

In still another aspect of the invention, the shopping cart liner may be converted into a bag for transporting articles independent of the shopping cart.

In another aspect of the invention, the shopping cart liner may be comprised of a foldable material. The foldable material may be substantially non-porous to prevent any cross-contamination of harmful substances between the shopping cart surface articles, occupants or users.

In yet another aspect of the invention, the shopping car liner may be comprised of a printable material for printing advertisements, announcements or promotionals thereon.

In the manner described above, the present invention provides a barrier for protecting transported articles and persons against pathogens and contaminants deposited on a shopping cart, which is not found in the prior art.

Additional features and advantages of the present invention are described in, and will be apparent from, the detailed description of the present exemplary embodiments and from the drawings.

BRIEF DESCRIPTION OF DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention addresses the shortcomings of the prior art by providing a barrier for protecting articles and persons transported in a shopping cart against debris, pathogens and contaminants deposited on the cart's surface. As noted, the debris, pathogens, residue, disease agents and other foreign particles or substances (collectively called "contaminants", herein), which may be found on the shopping cart surface, are typically transferred to the cart through normal use. For example, the contaminants may be mucus, bodily fluids, dirt, soot, pesticides, blood from meat or poultry products or pathogens transferred from a previous shopping cart user or articles transported in the shopping cart. The invention according to exemplary embodiments described herein is configured to provide a protective barrier substantially encasing the portions of the shopping cart that may come in contact with articles or persons transported in the cart during normal use.

Figure 1:
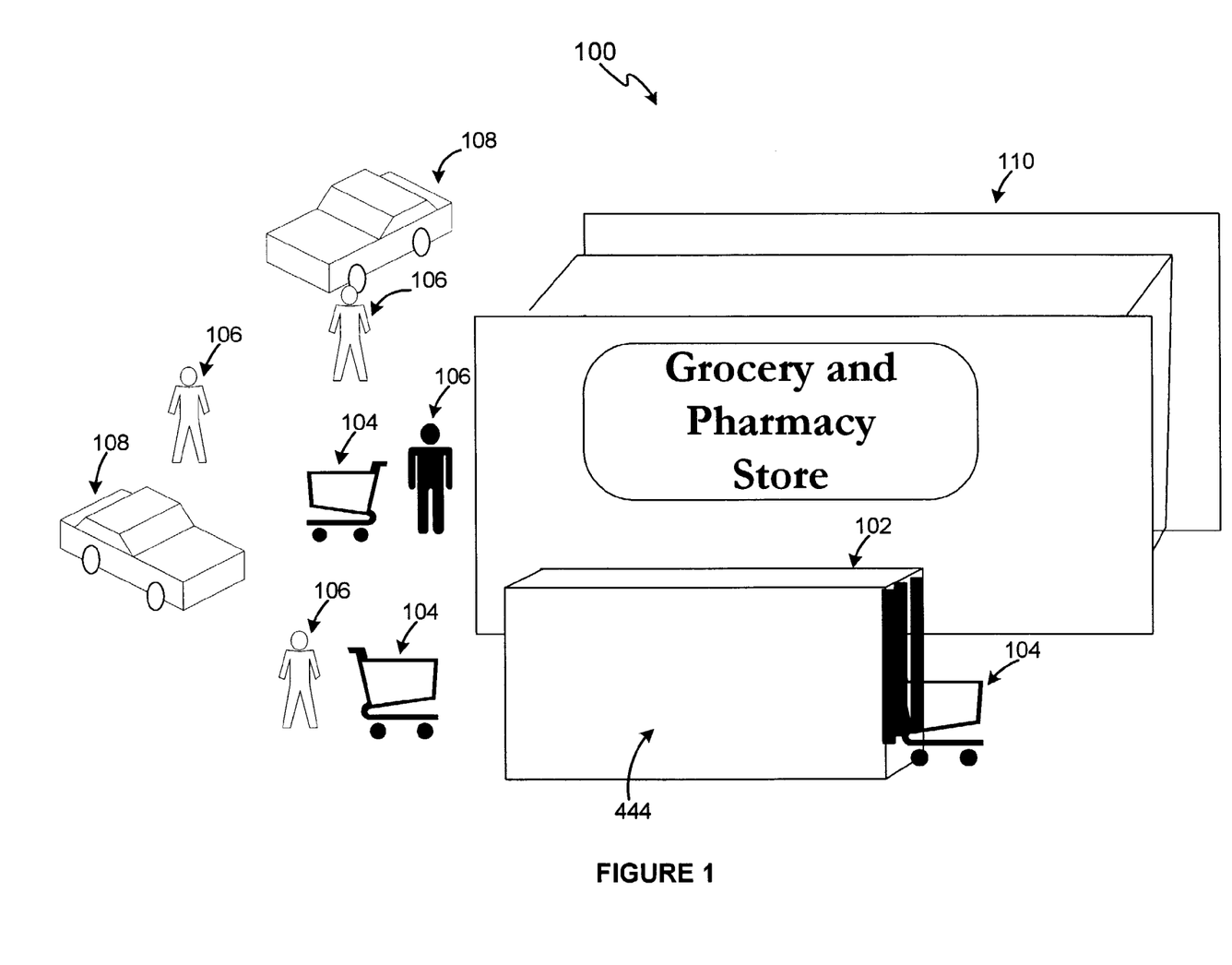
FIG. 1 illustrates an exemplary grocery store environment in which exemplary embodiments of the present invention may be used.

FIG. 1 illustrates a typical shopping environment 100 and shopping cart 104 which may be used with the present invention. Generally, the environment 100 may include a grocery store 110 for buying food or household products. A customer 106 may enter a store 110 and obtain a shopping cart 104 for use in transporting products to be purchased. The customer 106 may purchase any number of items from household chemicals (e.g., cleansers), food products (e.g., juices, packaged meat products), or the like, and place them in the shopping cart 104 for transport.

Figure 2:
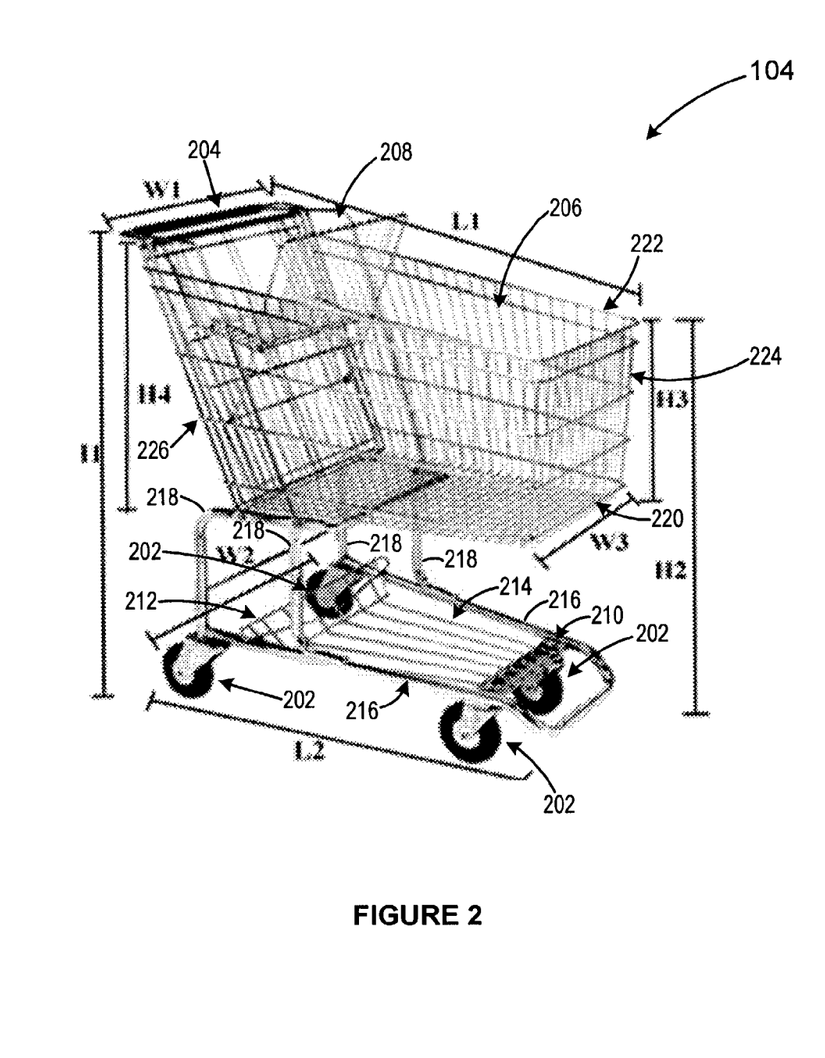
FIG. 2 illustrates an exemplary shopping cart which may be used in accordance with exemplary embodiments of the present invention.

In some instances the packaging of the chemicals or food products may not be properly sealed, permitting castoffs from the food products (e.g., mucus, fat, blood, etc.) or portions of the chemicals to be spilled onto a surface of the cart 104 on which the product to be purchased is transported. For example, if the product to be purchased is in contact with the shopping cart basket 206, child transport area 208, lower shopping cart shelf 214, or any other surface as is shown in FIG. 2 the cast off will contact and remain on a shopping cart upper surface. In this context, the shopping cart upper surface may include any upper surface of the cart 104 used for supporting articles or persons transported by the cart 104. For example, the shopping cart upper surface may include upper portions of the child transport area 208, lower shopping cart shelf 214, cart basket 206, or handle 204. The shopping cart upper surface may also include any other portions of the shopping cart which may contact persons, or articles during use.

Once the user 106 has selected the items and transported the items in the cart 104 to a check out counter, the user 106 may purchase the items. The user 106 may then leave the cart inside the grocery store 110 for use by a subsequent customer, or the user 106 may use the shopping cart 104 to transport the products purchased to her car 108 located in the store parking lot (not shown). After using the shopping cart 104 in any manner as described above, the shopping cart 104 is typically returned to the store 110 for reuse by subsequent customers without removing the contaminate materials adhering to the shopping cart upper surface.

While the present invention is described with respect to a grocery store 110, the invention is not so limited. The present invention may be used in any environment wherein carts are used to transport items. Particularly, the present invention may be used in any merchant environment wherein the cart may be soiled with contaminants during use. Exemplary merchant environments may include malls, grocery stores, laboratories, floral shops, medical treatment facilities, warehouses, or the like.

FIG. 2 depicts an exemplary shopping cart 104. A suitable shopping cart 104 may include a plurality of wheels 202 used to facilitate movement of the cart from a first location to a second location. The forward most wheels 202 positioned closest to the front of the cart 104 may be connected one to another using, for example, a forward lower shelf forward bar 210 connected such that the forward most wheels 202 may rotate. The rearward most wheels 202 positioned closest to the rear of the cart 104 may be connected using a least two side lower shelf bars 216, which may additionally be connected to lower shelf 214 forward bar 210. Lower shelf 214 may be configured such that the shelf 214 rests between bars 216 and 210. Additionally, lower shelf 214 may include a rearward bar 212, which may, or may not join the rearward wheels 202 one to the other.

Positioned atop and connected to the lower bars 216, via substantially parallel bars 218 may be a basket 206 for use in transporting the products to be purchased. Basket 206 may be any conventional shape, but is shown in FIG. 2 as a basket having substantially planar shaped sides 222 joined by a rear planar shaped side 226 (sometimes referred to as a gate), and a front planar shaped side 224. The basket 206 may additionally include a bottom 220 for resting the products to be purchased thereon, and the basket 206 may taper from the rear side 226 to the front side 224, such that the volume of the basket 206 is less toward the front planar shaped side 224.

Basket 206 may include a child transport area 208 adjacent to the basket 206 for use in transporting small children, and a handle 204 adjacent to the child transport area 208 for use in propelling the cart 104 and in directing the movement of the cart 208 by the user 106.

In various conventional constructions, the basket 206 may be made of metal. The basket 206 planar shaped sides 222, 224, 226 and bottom 220 may be made of wire formed in any configuration, such as, for example, a mesh or mesh-like pattern, as shown. Alternatively, the basket, may be constructed of other suitable durable material such as a hardened plastic, as is shown with respect to the cart 304 and basket 306 of FIG. 3.

Cart 104 and 304 may be of any shape, construction or material as is required for its intended use. For example, a cart for use with the invention may be made entirely of metal, as shown in FIG. 2. Alternatively, the cart may be constructed of metal and some there materials such as plastic, rubber, or the like, as is shown with respect to cart 304 of FIG. 3. In another exemplary embodiment, the cart used with this invention may be a flatbed cart as is known in the art. Suitable carts for use with the invention may be sold by, for example, Premier Carts, Inc., 3544 West 127th, Terrace, Leawood, Kans. 66209.

As noted, contaminants may be transferred to articles or persons transported in the shopping cart 104 during normal cart 104 usage. The present invention substantially prevents the articles or persons from contacting the contaminants by providing a barrier substantially covering the shopping cart upper surface, thereby preventing cross contamination between the articles or persons and the cart. In one exemplary embodiment, the barrier may be a flexible material structure, which lines the upper surface of the cart 104 for supporting the articles or persons transported therein.

Figure 4:
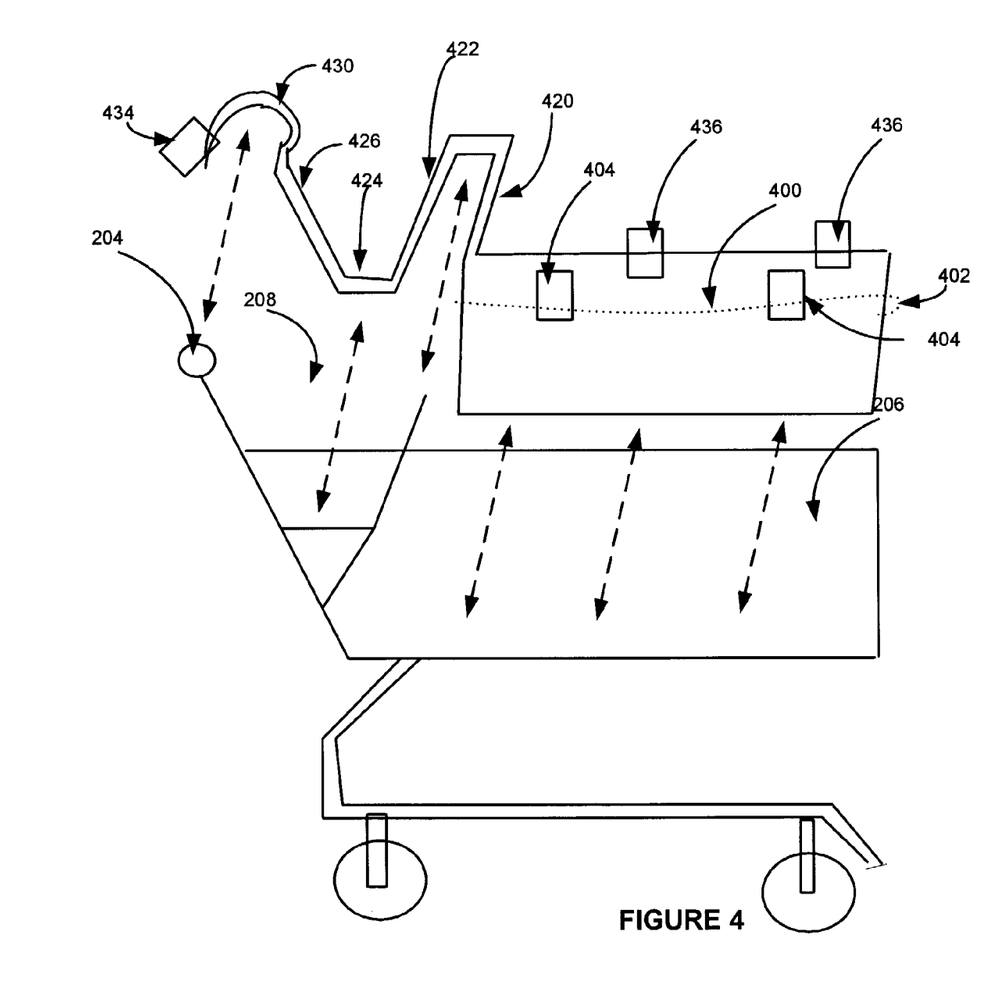
FIG. 4 illustrates an exemplary embodiment of a shopping cart liner system in accordance with the present invention.

FIG. 4 depicts an exemplary barrier (called "cart liner 400" herein) in accordance with an exemplary embodiment of the present invention. As shown, cart liner 400 may be disposed substantially on top of shopping cart basket 206, child transport area 208, and handle 204. In the exemplary embodiment depicted, the cart liner 400 substantially covers the shopping cart basket 206, child transport area 208, and handle 204 (called "contaminated surfaces" for brevity) and thereby provides a protective barrier in between the contaminated surfaces and any article or person transported by the cart 104. However, in other exemplary embodiments, the liner 400 may cover only the basket 206, the basket 206 and child transport area 208, or the basket 206, child transport area 206 and handle 204 exclusively.

Cart liner 400 may be composed of any suitable pliable material capable of being folded, collapsed or bunched. The cart liner 400 material may be composed of light-weight plastic, paper product, or fabric material. Suitable material may include thermoplastic, polyolefin, such as polyethylene, polypropylene, polyesters, vinyl polymers, or the like. In an exemplary embodiment, the liner is constructed of a non-padded and non-porous material. In another exemplary embodiment, liner 400 may be composed of water proof or leak proof paper material, such as for example Kraft paper. The paper material may be made leak proof or water proof by any conventional lamination methods. For example, the liner 400 may be laminated on the liner upper surface (shown in FIG. 5), the liner bottom surface (shown in FIG. 6), or both. In other exemplary embodiments the material may be disposable or recyclable. The material may be composed of single layer or composite layer sheets.

The thickness of the liner 400 will depend on the material selected as well as the intended contents of the cart 104. Generally, the thickness of the liner 400 may be in the range of from about 1-10 mils or alternatively from about 10-20 mils, or 20-30 mils. Most preferably, the liner 400 may be of sufficient stiffness and thickness to support any articles transported in the cart 104.

Figure 9:
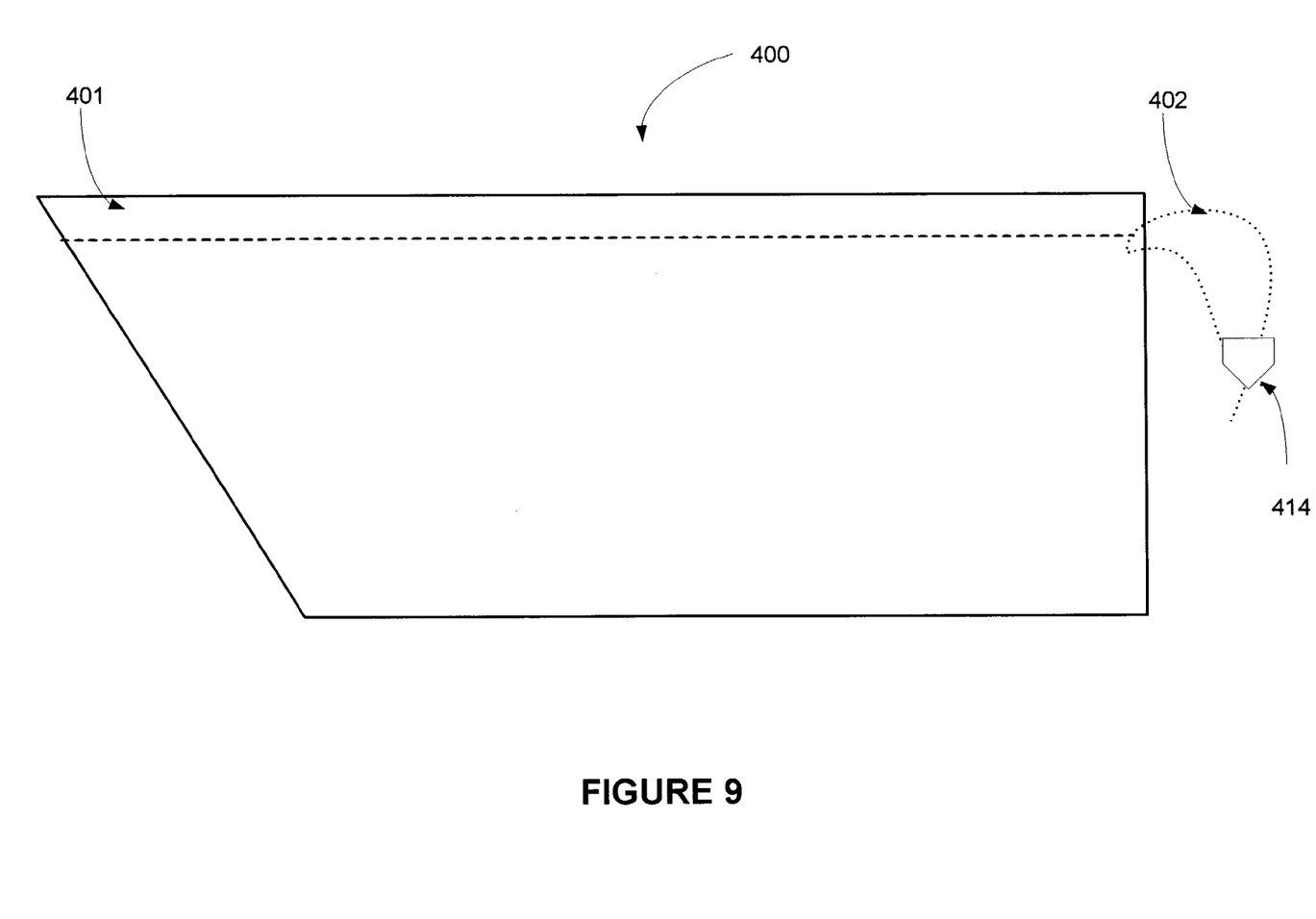
FIG. 9 illustrates an exemplary cart liner system in baglike configuration comprising a hemline for including a drawstring.

Cart liner 400 may include a draw tape or drawstring 402 positioned around the circumference of the liner 400. The drawstring 402 may be attached to the liner 400 using any suitable conventional attachment method. In one exemplary embodiment, the drawstring 402 may be attached by weaving in and out of apertures 404 in the liner 400. The apertures 404 may be disposed in the side 406, front 408, and rear 410 panels of the liner 400. Preferably, the apertures 404 are positioned in proximity to an upper portion of cart basket 206. In an alternate exemplary embodiment, the drawstring 402 may be disposed with a hemline 401 disposed in an upper portion of the liner 400 covering the basket 206 (shown in FIG. 9). In one exemplary embodiment, the drawstring 402 may include drawstring fastener 414 for ensuring that the drawstring 402 remains tightly pulled when the liner 400 is removed from the basket 206 for article transport (discussed more fully below).

Figure 3:
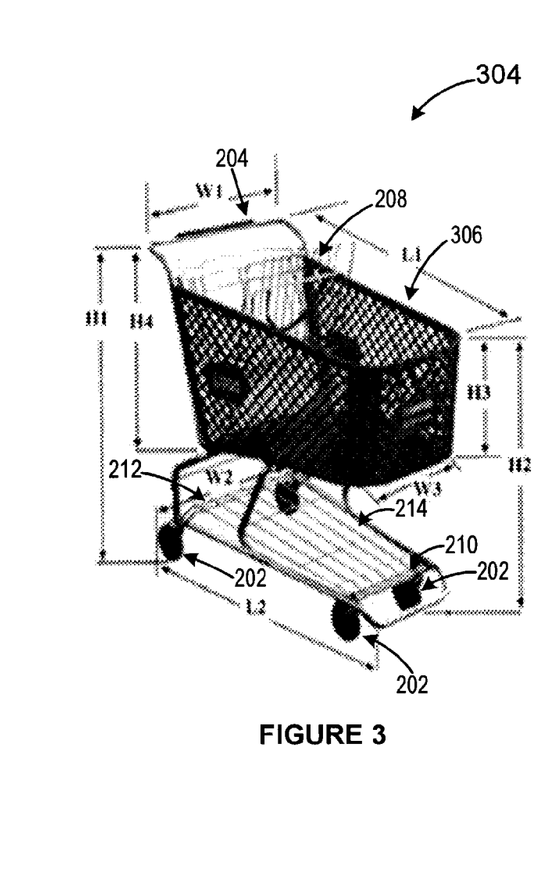
FIG. 3 illustrates another exemplary shopping cart which may be used in accordance with exemplary embodiments of the present invention.
Figure 5:
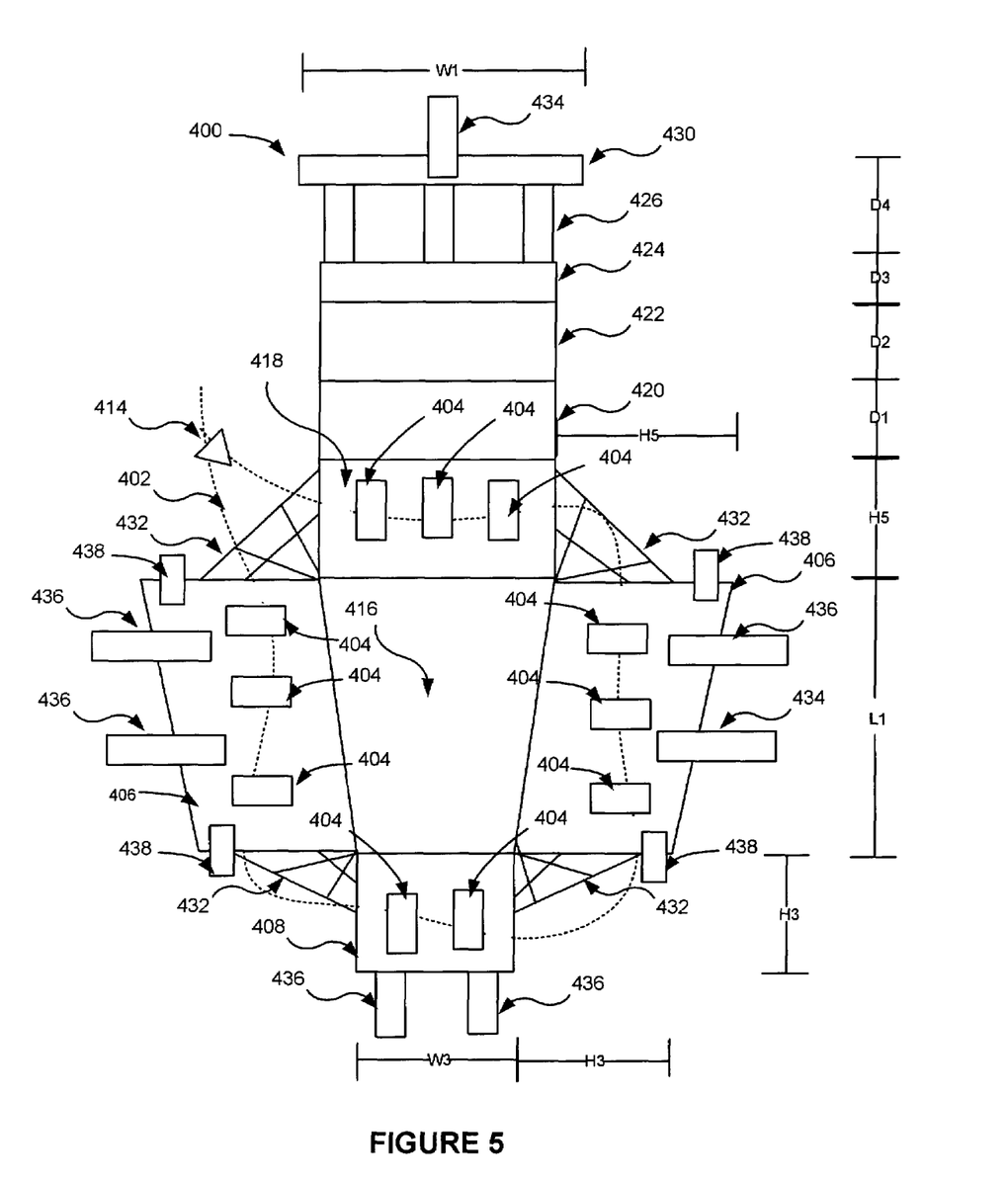
FIG. 5 depicts an upper surface of an exemplary shopping cart liner system in accordance with the present invention.
Figure 7:
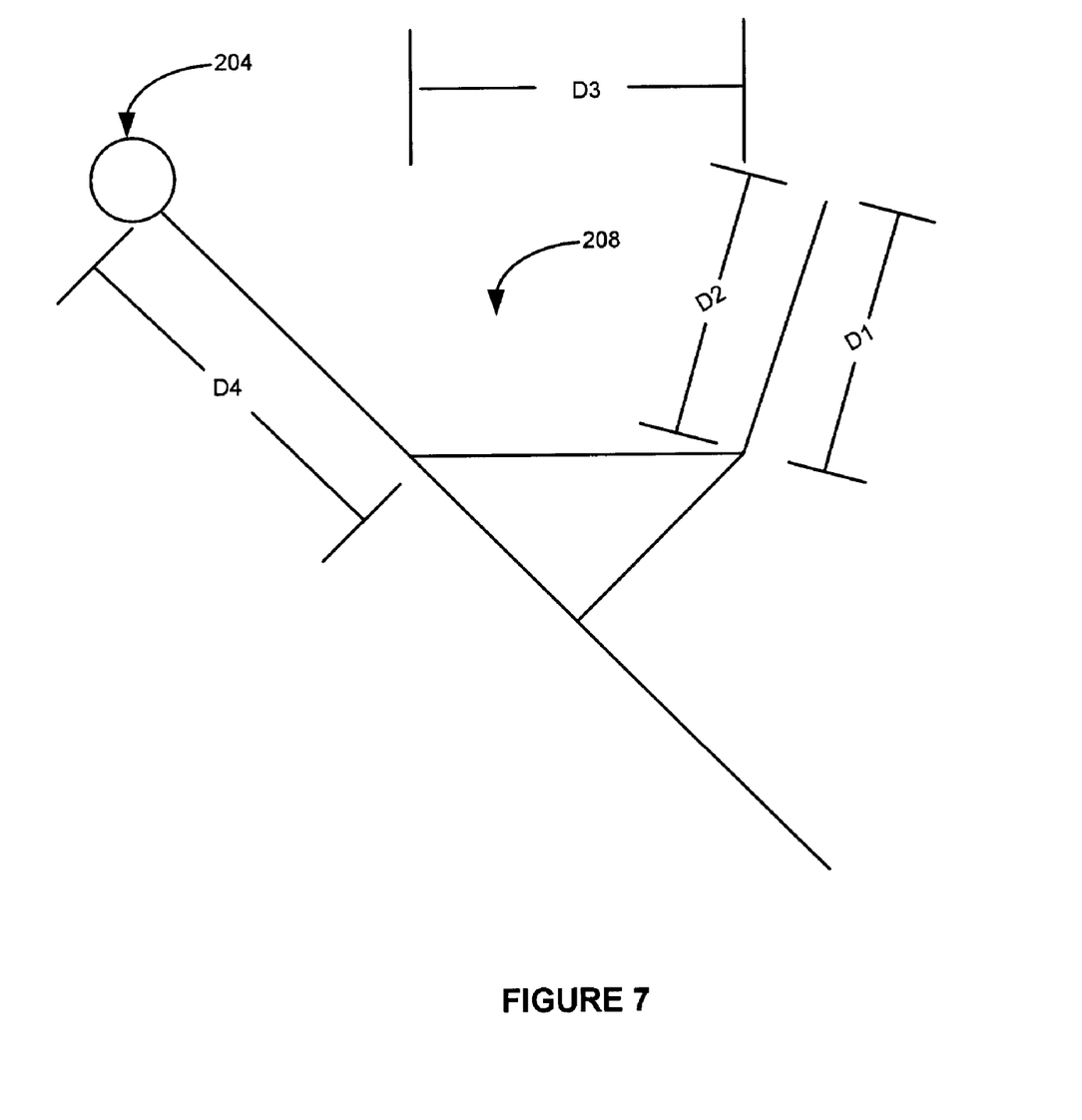
FIG. 7 depicts in cross section the dimensions of an exemplary shopping cart that may be used with the present invention.

With brief reference to FIGS. 2 and 3, the relative heights (H1-H4), widths (W1-W3) and lengths (L1 and L2) of an exemplary shopping cart 104, 304 are depicted. As such, the cart liner 400 may include similar dimensions as is indicated in FIGS. 5, showing the liner 400 upper surface. For example, the liner side portions 406 may have a height of H3 at a first end and a height H5 at a second end as shown. Liner bottom portion 416 may include a width W4 at a first end and a width W3 at a second end. Similarly, the cart liner front portion 408 may include a width W3 and a height H3, and the liner rear portion 418 may include a height H5 and a width W1. In this way, the liner bottom 416, front 408 and side portions 406 dimensions may closely follow the shape of the cart basket 206.

Where the shopping cart 104 includes a child transport area 208, the dimensions of the child transport area 208 may be given by the dimensions shown in FIG. 7. FIG. 7 depicts a typical cart 400 in cross section where distances D1-D4 show the relative distances of portions of the child transport area 208. D1 is the dimensional measurement of the child transport area back portion; D2 is the dimensional measurement of the child transport area front portion; D3 is the dimensional measurement of the child transport area seat portion; and D4 is the dimensional measurement of the child transport area for placing the legs of a transported child therein.

With return reference to FIG. 5, the dimensions D1-D4 are depicted with reference to liner 400. As can be seen, in exemplary embodiments where the cart 104 includes a child transport area 208, the liner dimensions are such that the liner 400 may substantially follow the dimensions of the area 206 (best show with further reference to FIG. 4).

The child transport area 208 of the liner 400 may include perforations at dimensional location D4 for including apertures for placement of a child's legs. The customer 106 may remove the perforated sections to provide an opening for leg placement.

In another exemplary embodiment, the cart liner 400 may include a barrier for protecting the user 106 from contaminants resting on the cart handle 204. In this instance, the liner 400 may additionally include a liner barrier portion 430 for providing a barrier for handle 204 adjacent to the child transport area 208. In this instance the barrier portion 430 may be of sufficient size to cover or wrap around the handle 204 (shown in FIG. 4). The barrier portion 430 may include a tab 436 for securing the barrier portion 430 to the handle 204. The tabs 436 may be adhesive on one side such that the tab 436 will adhere to the one side of the tab 436, or to the handle 204. In one exemplary embodiment, the tab 436 may be adhesive on its underside. The adhesive used with tabs 436 may be any conventional adhesive permitting the tab 436 to adhere to the tab 436 underside or to the cart 104. That is, the tab 436 may be adhesive on one side, and may be folded on itself to affix the handle portion 430 to the cart handle 204. In alternate embodiments, the tabs 486 may be conventional Velcro® tabs of the like as are known.

Although the shape and dimensions of the liner 400 are illustrated with respect to a conventional shopping cart 104, 304, the dimensions of liner 400 may be any suitable dimensions to substantially cover the upper surface of the cart 400. For example, various portions of the liner 400 may be eliminated where the cart 400 excludes the corresponding portions. If the cart 400 does not include a child transport area 208, then the liner 400 may excluded portions 420, 422, 424, and 426. In this instance, the liner back portion may be dimensionally similar to dimension H4 shown in FIGS. 2 and 3.

To ensure that the liner 400 remains in place in the cart 104 when in use, the material comprising the liner may be of sufficient rigidity such that the sides 406, front 408, and back 418 of the liner 400 remain upright. Suitable material includes any conventional paper product as is used in conventional paper grocery bags. For example, the liner 400 may be comprised of a heavy stock Kraft paper.

Alternatively, where the liner 400 is comprised of a material which may collapse in the basket 206 during use, the liner 400 may include tabs 434 of similar description as tabs 436 discussed above. That is, the tabs 434 may be adhesive on one side or may be Velcro® and may be folded over an upper portion of the cart panels 222, or to the liner sides 406 or front 408, or front panel 224 when the tab 434 is folded on itself.

As noted, in one aspect of the invention the liner 400 may be converted into a bag or sack for transporting the articles placed in the basket 206. To facilitate the conversion, the liner 400 may include gusset panels 432 attached to and joining a portion of the liner sides 406 with the liner front portion 408, and also attached to and joining the liner sides 406 with the liner back portion 418. The gussets 432 may be comprised of similar material as the liner 400. In one exemplary embodiment, the gussets 432 may be a web like or woven material to facilitate folding of the sides 406 against the liner front 408 and the liner back 418 when the liner is removed.

Figure 8:
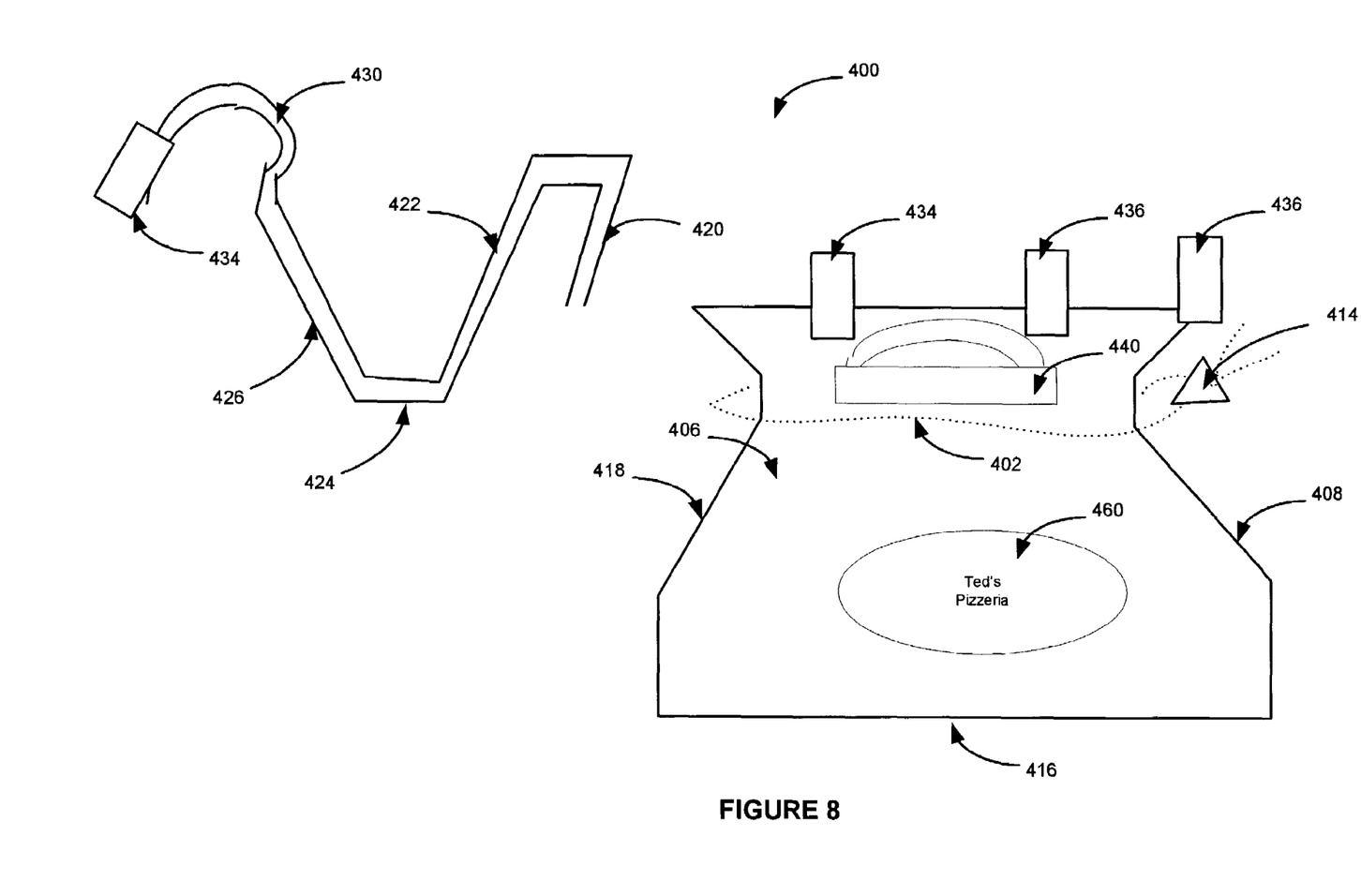
FIG. 8 illustrates an exemplary shopping cart liner system in baglike configuration in accordance with the present invention.

FIG. 8 is an exemplary depiction of the liner 400 upon removal from the cart 104. When present, the portions of the liner 400 designed to cover the child transport area 208 and the handle 204 may be folded inside the basket 206. In this way, the liner child transport area portions 420, 422, 424, 426, and handle portion 430 do not substantially interfere with the closing of the liner 400 into a baglike shape. In another exemplary embodiment shown in FIG. 8, the child transport area portions 420, 422, 424, 426 and handle portion 430 may be removed from the liner basket back portion 418 prior to shaping the liner into its baglike configuration. To facilitate the removal of the child transport area portions 420, 422, 424, 426 and handle portion 430, the liner child transport area portion 420 may be joined to the liner back portion 418 using any conventional method allowing easy removal. For example, the liner child transport area portion 420 may be joined to the liner back portion 418 using conventional perforations. Alternatively, the liner child transport area portion 420 may be joined to the liner back portion 418 using a conventional pleating, wherein an incision is drawn at the joining substantially through the material of the liner 400 to facilitate easy removal. Additionally, the tabs 434, 436 may be removable from the liner 400, or easily torn so that the tabs 434, 436 may be removed from the cart 104, or the adhesive used with the tabs 434, 436 may be such that the tabs 434, 436 may be un-adhered from the tabs 434, 436 or from the cart 104. Upon removal, the customer 106 may collapse the sides of the liner 406 onto the front 408 and the back 418 of the liner 400 using the drawstring 402. The gussets 432 may permit further collapsing of the sides 406 onto the front 408 and back 418.

Figure 6:
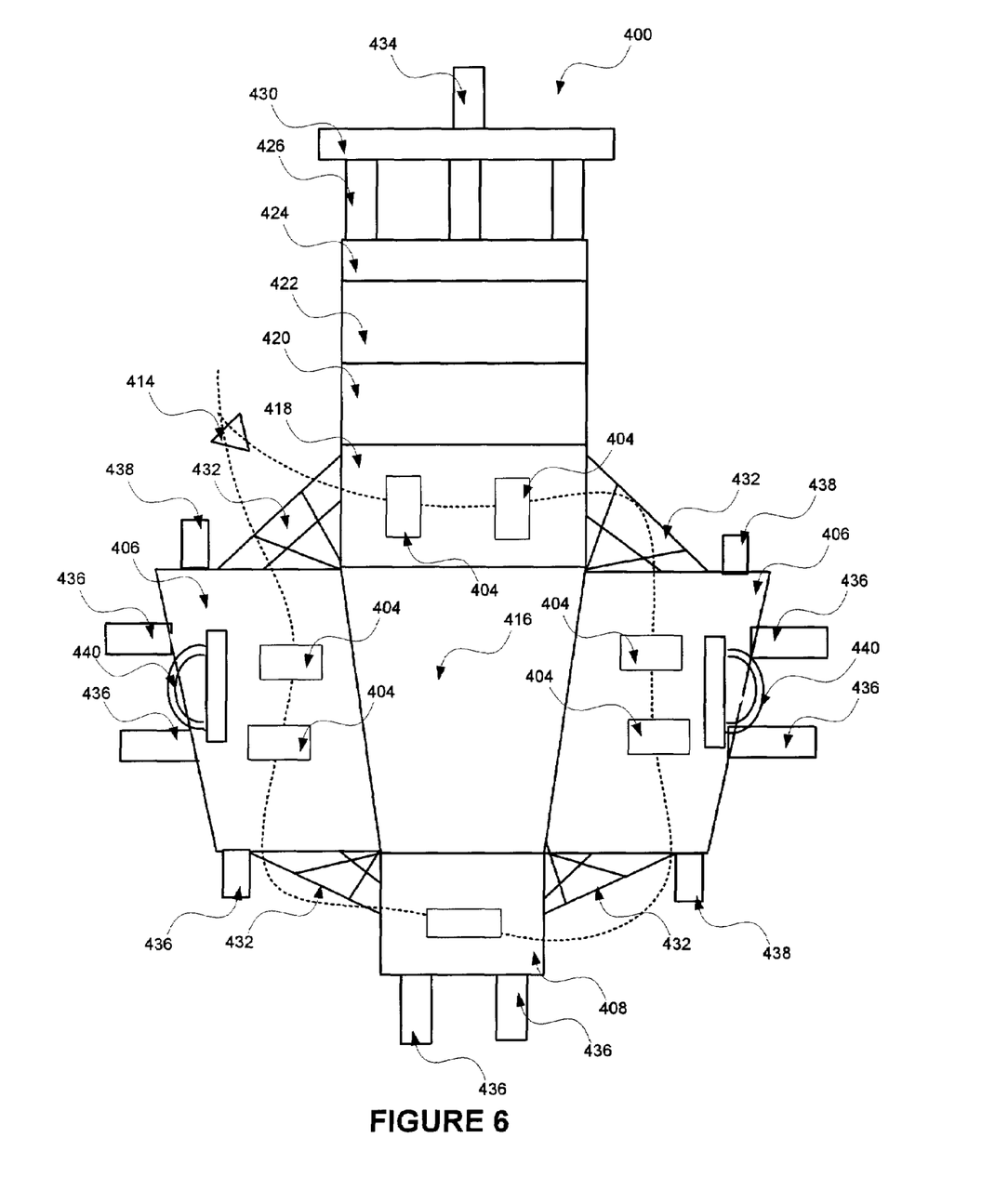
FIG. 6 depicts a bottom surfaces of an exemplary shopping cart liner system in accordance with the present invention.

FIG. 6 depicts the bottom surface of liner 400. As shown, the bottom surface of the liner 400 may include carrier handles 440, which may become visible when the liner 400 is removed from the cart 104. The carrier handles 440 may be attached to or formed contiguous with the liner 400 using any conventional attaching method. Once the liner 400 is formed into its baglike shape as shown in FIG. 8, carrier handles 440 may be used for transporting the articles contained in the liner 400.

In another exemplary embodiment of the invention, liner sides 406 may include tabs 438 of similar description as tabs 434 and 436. That is, tabs 438 may be adhesive or Velcro® on one side for permitting the tab to affix to the bottom surface of liner front 408 and liner back 418 to facilitate the shaping of the liner 400 into its baglike shape. Upon removal of the liner 400 from the cart 104, the tabs 438 may be adhered to the line front 408 and liner back 418 to permit the liner 400 to substantially hold its form. In one preferred embodiment, the upper side of the tab 438 may include the adhering substance.

In another exemplary embodiment, the material comprising the liner 400 may be printable material. The material may permit the adding of advertisements 460 (shown best in FIG. 8) on notices on the bottom surface of the liner (shown in FIG. 6). The material may permit a merchant to post notices or advertise products for consumer edification.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the liner sides 406 may be glued to the liner front 408 or liner back 418 using any conventional glue process, prior to use in cart 104. An exemplary process may include conventional hot glue process as is used to construct conventional Kraft paper shopping bags. In this way, the liner 400 may be preformed prior to inserting the liner into cart basket 206.

Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented.

The invention claimed is:

1. A system for transporting groceries comprising a shopping cart in combination with a disposable shopping cart liner wherein:
   said shopping cart comprises a cart basket comprising a front side, a rear side, and two opposing sides connected to said front side and said rear side, and a child transport area adjacent to said cart basket; and
   said disposable shopping cart liner comprises a single cart basket liner comprising a single, non-padded and non-porous basket front liner portion disposed against said front side, a single non-padded and non-porous basket back liner portion disposed against said rear side, and two non-padded and non-porous basket side liner portions disposed against said two opposing sides, a child transport area liner constructed of non-padded and non-porous material disposed within said child transport area in communication with said single cart basket liner, and a cart handle liner in communication with said cart child transport area liner, at least one tab for affixing said single cart basket liner to said shopping cart wherein said cart basket liner tab is removable from said single cart basket liner.

2. A system according to claim 1, wherein said disposable shopping cart liner further comprises a carrier handle.

3. A system according to claim 1, wherein said disposable shopping cart liner further comprises a drawstring, said drawstring affixed to said single cart basket liner.

4. A system according to claim 3, wherein said drawstring further comprises a drawstring fastener.

5. A system for transporting groceries comprising a shopping cart in combination with a disposable shopping cart liner wherein:
   said shopping cart comprises a cart basket comprising a front side, a rear side, and two opposing sides connected to said front side and said rear side, and a child transport area adjacent to said cart basket; and
   said disposable shopping cart liner comprises a single cart basket liner comprising a single, non-padded and non-porous basket front liner portion disposed against said front side, a single non-padded and non-porous basket back liner portion disposed against said rear side, and two non-padded and non-porous basket side liner portions disposed against said two opposing sides, a child transport area liner constructed of non-padded and non-porous material disposed within said child transport area in communication with said single cart basket liner, and a cart handle liner in communication with said cart child transport area liner wherein said cart handle liner further comprises a tab that is removable from said cart handle liner.

6. A system according to claim 5, wherein said disposable shopping cart liner is removable from said shopping cart.

7. A system according to claim 6, wherein said disposable shopping cart liner is convertible into a non-padded and non-porous shopping bag for transporting articles.

8. A system according to claim 5, wherein said disposable shopping cart liner is comprised of a plastic material.

9. A system according to claim 5, wherein said disposable shopping cart liner is comprised of a printable material.

* * * * *